United States Patent Office 3,565,692
Patented Feb. 23, 1971

3,565,692
RECHARGEABLE NON-AQUEOUS ALKALI METAL-HALOGEN ELECTROCHEMICAL CELLS
Joseph L. Weininger, Schenectady, N.Y., assignor to General Electric Company, a corporation of New York
No Drawing. Filed Oct. 27, 1966, Ser. No. 589,823
Int. Cl. H01m 27/00
U.S. Cl. 136—86                                                    11 Claims

ABSTRACT OF THE DISCLOSURE

A rechargeable non-aqueous alkali metal-halogen electrochemical cell is described which includes an alkali metal anode, a halogen cathode, a non-aqueous electrolyte, and an ion permeable barrier between the electrodes separating the electrolyte into anolyte and catholyte reservoirs. The barrier has finely divided particles having through pores and a binder joining the particles into a unitary structure.

---

My invention relates to an electrochemical cell system utilizing an alkali metal anode, a halogen cathode, and a non-aqueous electrolyte.

Of the recognized restraints on enlarged applications of electrochemical cell systems the limitations of low cell potential and low energy density have remained paramount, despite long continued efforts at their improvement. To one having only a casual acquaintance with the electrochemical arts, achieving an improvement in cell potential and energy density over the cells presently commercially available might, at first encounter, seem a simple matter. Inasmuch as alkali metals lie near one extreme of the electromotive series of elements and halogens near the opposite extreme, it would appear obvious that an electrochemical cell system capable of utilizing alkali metal as an anode reactant and halogen as a cathode reactant would yield an exceptionally high potential as compared to cells commonly employed commercially. When the high potential characteristics of these materials are further considered in combination with the low equivalent weights of certain of the materials, such as lithium, sodium, and chlorine, alkali metals and halogens also appear desirable for use in constructing cells and batteries capable of yielding a high energy output per unit of weight.

As might be expected both halogens and alkali metals have been thoroughly investigated as electrode reactants for electrochemical cell systems both separately and in combination. Despite many articles published and patents issued relating to improvements in cells comprised of such reactants, to this date no significant commercial exploitation of these materials either singly or in combination has been undertaken.

A number of previously unsolved difficulties relating to alkali metal and halogen electrodes account for this continued non-use. First, whereas aqueous electrolytes have been used nearly universally in both "wet" and "dry" cells, alkali metals spontaneously react with water to liberate hydrogen gas and form the corresponding alkali hydroxide. The main approach to solving this difficulty has been the identification of various non-aqueous solvents which are inert to alkali metals. While organic solvents have been suggested for use in such cells, no solvent sufficiently stable toward both alkali metal and halogen electrode reactants has been heretofore disclosed. For example, primary amines have been proposed as solvents for lithium bromine cells, but such amines contain relatively active hydrogen that interfere with the proper functioning of the lithium electrode.

Another approach to using alkali metal electrode reactants has been to dissolve the metal in a mercury amalgam. One disadvantage to this approach is that a parasitic loss of alkali metal still takes place at the interface of the aqueous electrolyte and the amalgam. A further disadvantage is that, absent agitation of the amalgam, the current density that can be sustained by any such electrode is limited by the rate at which the alkali metal can diffuse through the amalgam. The disadvantages of constructing a cell requiring continuous pumping or agitation are, of course, obvious. Another consideration is that the alkali metal concentration of the amalgam must be limited to only a few percent in order to maintain a fluid amalgam. This then means that a substantial weight of mercury must be incorporated in any cell in order to attain any substantial capacity. Certainly, the amalgam electrode approach does not appear particularly beneficial to achieving a high energy density cell.

Halogen electrodes, while disclosed in the patent literature prior to the turn of the century, have to this day presented a number of well-recognized disadvantages. One of these is low solubility of halogens in aqueous electrolytes. This has markedly limited the attainment of the high energy densities from halogen cells that might be predicated on molecular weight considerations. Another disadvantage of halogen electrodes is that while halogens must be dissolved to be utilized, such dissolved halogens will migrate to the anode and chemically react to spontaneously discharge the cell. Perhaps the most common approach to attempting to control halogen mobility has been to adsorb the halogen on a carbon matrix, such as graphite or charcoal. Another approach has been to interpose an ionically permeable diffusion barrier for unreacted halogen between the halogen cathode and the cell anode. Such approach has, however, heretofore been confined to an aqueous electrolyte system. In a non-aqueous electrolyte system permitting higher halogen concentrations it is not apparent that the type of barriers heretofore employed would be sufficiently impermeable. Also, with higher halogen concentrations it is not apparent that such barriers would remain sufficiently chemically resistant, dissolved halogens being highly corrosive materials.

It is an object of my invention to provide a rechargeable electrochemcial cell exhibiting a high energy density and capable of developing a relatively large potential between the electrodes.

It is another object of my invention to provide a novel ionically permeable barrier for separating anolyte and catholyte reservoirs.

It is a more specific object to provide such a novel barrier for hindering the migration of dissolved halogen of intermediate molecular weight as well as polyhalides thereof from a catholyte reservoir.

According to one aspect, my invention is directed to a barrier for separating an anolyte and a catholyte reservoir comprised of finely divided particles having through pores of an average diameter less than approximately 200 angstroms and a binder chosen of a material chemically inert to the constituents of the reservoirs and present in an amount sufficient to join the particles at their points of tangency into a unitary structure.

As herein employed, the terms anode, anolyte, cathode, and catholyte refer to the negative electrode, the electrolyte adjacent the negative electrode, the positive electrode, and the electrolyte adjacent the positive electrode, respectively. That is, the terms are for convenience used as they would apply to the cell when used as a primary cell or during discharge when used as a secondary cell, although it is recognized that on charge of the cell when used as a secondary cell the elements would function inversely.

In a preferred embodiment of my invention, I employ alkali metal as a negative electrode reactant, hereafter, in accordance with accepted usage, designated an alkali metal electrode. Of the alkali metal electrodes I prefer to use lithium electrodes, since lithium is the alkali metal with the highest oxidation potential and the lowest molecular weight. The alkali metal may entirely comprise the electrode or it may be supported on a more noble metal, such as nickel, platinoid metals, silver, etc., according to techniques well understood in the art.

As a positive electrode reactant halogen of intermediate molecular weight is preferred. Chlorine, bromine, or iodine may be used alone or in combination. As is well understood, the electrical properties—i.e., electrode potential and energy density characteristics—improve with decreasing atomic weight while the chemical properties become increasingly less suitable. Although fluorine is the halogen most easily reduced and of lowest atomic weight its use is not preferred because of the off-setting practical disadvantages of extremely high reactivity and corrosiveness. Astatine, because of its rarity, is of no practical interest. Of the intermediate molecular weight halogens bromine is generally most preferred as an electrode reactant, since it offers the most practically suitable balance of chemical and electrical properties.

Inasmuch as halogen reactants are fluid under the conditions of use, it is necessary that the halogen electrode include a current collector. As is recognized in the art, the current collector may be formed of any electrically conductive material which is chemically stable toward the halogen and the polyhalides thereof. For example, bromine and its intermediate reduction product, the tribromide anion, are sufficiently stable toward carbon, tantalum, and platinum that these metals may be usefully employed as current collectors. Chlorine is also stable toward these materials while iodine, being less chemically reactive, is chemically stable toward these materials as well as the platinoid metals generally. In order to achieve high current densities it is preferred that the current collectors be fabricated into a form exhibiting a high surface area per unit weight. Because of its low cost and high specific surface area carbon in the form of charcoal or graphite is generally preferred as a current collector.

The positive and negative electrodes are ionically communicated by an electrolyte. Lactones and alkylene carbonates having five and six member rings are chemically stable toward both intermediate molecular weight halogen and alkali metal electrodes. Such materials accordingly may be used to form the solvent of an electrolyte for such electrodes. Acceptable properties are obtainable with alkyl ring substituents contributing in aggregate up to about three additional carbon atoms. Suitable solvent materials include 1,2-alkylene carbonates, 1,3-alkylene carbonates, gamma lactones, and delta lactones. Specifically contemplated solvents include, ethylene carbonate, 1,2-propylene carbonate, 1,3-propylene carbonate, 1,2-butylene carbonate, 2,3-butylene carbonate, 1,3-butylene carbonate, 1,2-amylene carbonate, 2,3-amylene carbonate, 1,3-amylene carbonate, 2,4-amylene carbonate, 1,3-hexylene carbonate, 2,4-hexylene carbonate, 1,2-hexylene carbonate, 2,3-hexylene carbonate, and gamma butyrolactone as well as the lactones of 4-hydroxypentanoic acid, 5-hydroxypentanoic acid, 4-hydroxyhexanoic acid, 5-hydroxyhexanoic acid, 4-hydroxy - 5 - methylhexanoic acid, 4-hydroxyheptanoic acid, 5-hydroxyheptanoic acid, 4-hydroxy - 5 - methylheptanoic acid, 5-hydroxy - 6 - methylheptanoic acid, and 5-hydroxyoctanoic acid.

Any material that is ionically dissociable in the solvent and chemically inert toward the electrode reactants may be employed as a solute for the electrolyte. Where alkali metal and halogen electrodes are employed in combination, the solute may be an alkali halide. As is well understood in the art the ionized alkali halide provides ionic electrical conductivity between the electrodes. Cells using alkali halide as the sole ionic conductor function satisfactorily, but are subject to the disadvantage that if over-charged solute may be substantially depleted from the electrolyte, thereby adversely affecting its conductivity. Accordingly, in certain applications it may be preferred to incorporate as the solute alkali perchlorate. This insures a high initial level of electrolyte conductivity, even following over-charge. It is recognized that upon discharge of an alkali metal-halogen cell alkali halide will be formed as a reaction product and will supplement the alkali perchlorate in providing electrical conductivity between the electrodes. It is, of course, preferred that the alkali metal and halides incorporated as the electrolyte solute correspond to the alkali metal and halogen employed as electrode reactants. The concentration of the solute in the solvent is not critical. It is generally preferred to incorporate the minimum amount sufficient to yield the desired level of conductivity when the cell is fully charged.

Whereas conventional halogen electrode cells employing an aqueous electrolyte require storage of the halogen by adsorption in the current collector, this frequently resulting in a bulky halogen electrode structure, in my cell the organic solvent electrolyte exhibits substantial solubility toward intermediate molecular weight halogen, so that the halogen reactant may be stored completely within the electrolyte or may be only partially adsorbed on the current collector and the remainder dissolved in the electrolyte.

It has been recognized in the art that electrolyte dissolved halogen left alone will migrate to the negative electrode and chemically react therewith to produce self-discharge of the cell. It has accordingly been proposed to utilize an ion permeable barrier capable of hindering the migration of molecular halogen to separate the electrolyte into anolyte and catholyte reservoirs. By this means it has been proposed to confine the dissolved halogen to the catholyte reservoir to avoid the disadvantages of self-discharge.

Heretofore ion exchange membranes have been employed as ion permeable barriers in aqueous electrolyte cells including dissolved halogen as an electrode reactant. Both cation and anion exchange membranes have been employed indiscriminately. A disadvantage associated with the use of anion exchange membranes is that cells including such barriers may be internally discharged by polyhalides, which being anions, are free to pass through anion exchange membranes. Another disadvantage associated with all previously known ion exchange membranes is their relatively high resistance. This has produced significant cell polarizations at even modest current drains.

To avoid the high internal resistances imparted by conventional ion exchange membranes, I have developed a novel ion permeable barrier for use in electrochemical cells. The barrier is formed by binding into a unitary structure particles having very small through pores. Although not essential to utility, the particles preferably exhibit ion exchange properties and, most preferably, cation exchange properties. Such particles differ from normal ion exchange resin particles in that they exhibit structurally fixed pores. The term "macro-reticular" is frequently used to distinguish from conventional ion exchange resin particles which are termed "micro-porous," although universally recognized to lack pores in the conventional, structural sense of the term. The particles may be formed from hydrocarbon or halocarbon polymers according to known techniques. After formation the particles may be chemically treated to provide ion exchange substituents. Where ion exchange properties are combined it is preferred that only cross-linked polymers be used. Where the particles are to be used as a barrier for the migration of intermediate molecular weight halogen and polyhalides thereof the pores are, of course, chosen of a size that will allow migration hindrance while permitting migration of monohalides. It has been determined that average pore sizes of less than 200 angstroms are effective for this purpose, average pore sizes of less than 100 angstroms being preferred. Larger pore sizes may be used with reduced efficiency. As a specific example of suitable particles having through pores, Rohm and Haas Company commercially markets under the trademark "Amberlite XAD–2" a macro-reticular material formed of the copolymer of styrene and divinyl benzene having average pore diameter of 90 angstroms. Other forms of the material differing by average pore size and by the inclusion of sulfonate groups are available under the trademarks "Amberlyst XN 1005" and "Amberlyst 15." These are merely exemplary of a family of suitable particulate materials available under the trademarks "Amberlite" and "Amberlyst."

To form a unitary barrier I prefer to crush the particles so that they pass through a 50 mesh screen, although this is not essential, and to bond the particles with a hydrocarbon or halocarbon polymer, most preferably a fluorocarbon polymer. Specific preferred binders are polymers of vinylidene fluoride and chlorotrifluoroethylene as well as copolymers thereof. It is, of course, recognized that there are a large number of hydrocarbon and halocarbon polymers that could be used including but not limited to polyethylene, polypropylene, polystyrene, polyvinyl chloride, polyvinylidene chloride, polyhexafluoropropylene, polytetrafluoroethylene, etc. The binder is preferably limited to the minimum amount sufficient to bond the particles at their points of tangency. It is recognized that this quantity will vary somewhat, depending on the particle size of the macro-reticular particles. In using materials passing through a 50 mesh sieve binder proportions of as little as 10 percent and as great as 90 percent by volume have been found satisfactory.

The binder may be applied by any of a variety of conventional molding techniques. According to a preferred technique in which the binder softens at a temperature substantially below that of the material comprising the macro-reticular particles, the composite is placed in a mold and heated to the softening temperature of the binder. This technique works well in the preferred embodiment in which the macro-reticular particles are formed of a thermosetting cross-linked ion exchange material and the binder is a thermoplastic fluorocarbon.

The advantage of using an ion permeable barrier having through pores as described over a conventional cation exchange membrane is that the former exhibits a fraction of the electrical resistance of the latter for comparable ion exchange ratings and thicknesses. In one form of the barrier in which ion exchange properties are absent, the through pores function in a manner analogous to a sieve in permitting the migration of small ions therethrough while proportionately hindering the migration of larger ions. Accordingly, simple mono-atomic halide anions penetrate the barrier pores with ease while dissolved molecular halides and polyhalides thereof are hindered in migration. When the barrier is additionally provided with cation exchange properties, the ionic permeability is enhanced by the ability of cations to be readily exchanged through the pores. At the same time smaller size anions and cations may penetrate the pores by diffusion while larger size anions are not only physically hindered from passage through the pores but are additionally electrically repelled.

In a preferred, comprehensive embodiment of my invention I contemplate the use of an organic solvent electrolyte and my novel ion permeable barrier in combination with alkali metal and intermediate molecular weight halogen electrodes. These elements cooperate to form a chemically compatible, novel electrochemical cell providing a solution to many of the difficulties heretofore encountered in the art. At the same time, however, it is recognized that an alkali metal halogen cell presents the most stringent of chemical requirements and other positive or negative electrodes may be readily substituted without resorting to invention. I additionally recognize that my novel barrier significantly advances the state of the art relating to separators generally, since the principles discovered are readily applied to diverse electrochemical cell systems.

My invention may be more readily understood by reference to the following working examples.

EXAMPLE 1

Macro-reticular beads of sulfonated styrene-divinyl benzene copolymer were purchased from Rohm and Haas under the trademark "Amberlyst 15." The beads contained pores having an average diameter of 400 angstroms, a porosity of from 30 to 35 percent, and a surface area of from 40 to 50 m.$^2$/g. As purchased, the beads were in the hydrogen ion form. They were exchanged into the lithium form by soaking three times in a 0.2 molar solution of lithium bromide in propylene carbonate. Between each soaking the material was vacuum dried. The beads were then crushed and sifted through a 50 mesh screen. Polychlorotrifluoroethylene purchased under the trademark "Kel-F" was prepared as a powder passing through a 35 mesh screen. The polychlorotrifluoroethylene was charged to a molding surface held at 240° C. in an amount of 0.3 gram. When the material showed signs of melting, 0.9 gram of "Amberlyst 15" previously prepared and crushed as described above was added. Molding was accomplished at a gauge pressure of 15,000 p.s.i. A membrane was obtained having a thickness of 17 mils and a diameter of 2 inches.

EXAMPLE 2

The procedure of Example 1 was repeated, except that "Amberlyst XN 1005" was substituted for "Amberlyst 15." The former material differs from the latter in that it has average pore diameter of 80 angstroms, a porosity of 42 percent, and an average surface area of 125 m.$^2$/g. "Amberlyst XN 1005" was used in the amount of 0.75 gram and polyvinylide fluoride purchased under the trademark "Kynar" was used in like amount. A molding temperature of 165° C. and a pressure of 22,500 p.s.i. were used. The resultant membrane was 10 mils thick and 2 inches in diameter.

EXAMPLE 3

The procedure of Example 1 was repeated, except that "Amberlite XAD–2" was substituted for Amberlyst 15." The former material differs from the latter in that it is not sulfonated, therefore devoid of ion exchange properties, and has average pore diameters of 90 angstroms, a porosity of from 40 to 45 percent, and a surface area of 290 to 330 m.$^2$/g. "Amberlyst XAD–2" and "Kynar" were each used in the amount of 0.75 gram. Molding was accomplished at 165° C. and a pressure of 22,500 p.s.i. The resultant membrane was 22 mils thick and 2 inches in diameter.

In each of the following examples a test cell construction was used having a lithium electrode immersed in an anolyte and uniformly spaced $\frac{1}{16}$ in. from one surface of a barrier and a carbon electrode immersed in a catholyte and uniformly spaced $\frac{1}{16}$ in. from the opposite surface of the barrier. The lithium electrode was in each instance formed of a $\frac{1}{16}$ in. deposit of lithium supported on a 50 mesh screen of either platinum or silver plated nickel. The carbon electrode, except as otherwise noted below, was formed of a $\frac{1}{8}$ in. thickness of spectrographic grade carbon of high purity and having 25 percent porosity.

EXAMPLE 4

A cell was constructed as described above using the ion permeable barrier prepared by Example 1, 0.2 molar lithium bromide in 1,2-propylene carbonate as the anolyte, a lithium anode, 0.2 molar lithium bromide together with 1 molar dissolved bromine in 1,2-propylene carbonate as the catholyte, and carbon as the cathode current collector.

An open circuit voltage of 4.04 volts was obtained, which on the Kordesch-Marko bridge used, which eliminates ohmic resistance of the cell, was maintained at this value with increasing current load to the limit of the bridge (about 12 ma./cm.$^2$). The cell resistance was 100 ohms, equivalent to 283 ohm-cm.$^2$.

EXAMPLE 5

The cell used in Example 4 was modified by increasing the bromine concentration to 1.50 molar and increasing the lithium bromide concentration to 1.60. The cell exhibited an open circuit voltage of 3.77 volts. The cell was placed through seven charge-discharge cycles with charge and discharge each being performed in one hour at the current of approximately 5 ma. During discharge the cell exhibited a potential of approximately 2.5 volts. The cell showed no signs of deterioration in use.

EXAMPLE 6

A cell was constructed using a membrane as prepared in Example 3, which lacked ion exchange properties. A lithium anode was used and a carbon cathode current collector as described above. The anolyte consisted of 1.37 molar lithium perchlorate and 1.0 molar lithium bromide in gamma-butyrolactone. The catholyte was identical to the anolyte except for additional inclusion of 0.14 mole of concentration of dissolved iodine.

The cell had an open cell voltage of 3.98 to 3.39 volts, depending on its state of charge. The internal resistance was 164 ohms, equivalent to 462 ohm-cm.$^2$. The cell was placed through ten charge-discharge cycles with charge intervals of 30 minutes at 10 ma. and discharge intervals of 60 minutes at 5 ma. The voltage varied from 2.2 volts to 1.5 volts on discharge.

EXAMPLE 7

A cell was constructed using a membrane as described by Example 2. A lithium anode was used and a carbon cathode current collector was employed. The anolyte was 2.6 molar lithium perchlorate in 1,2-propylene carbonate, and the catholyte was 0.2 molar lithium bromide and 0.12 molar iodine in 1,2-propylene carbonate. An open circuit voltage of 3.92 volts was obtained. The cell was placed through four charge-discharge cycles with charge and discharge each being performed in one hour at the current density of approximately 2 ma./cm.$^2$. No deterioration in cell performance was noted.

EXAMPLE 8

A cell was constructed using a membrane as prepared by Example 2. A lithium anode was employed, and the cathode was formed of battery grade carbon. The carbon exhibited a porosity of 80 percent and a purity of 99.9 percent. The anolyte consisted of 0.4 molar lithium iodide and 1.0 molar lithium perchlorate in 1,2-propylene carbonate. The catholyte consisted of 0.74 molar lithium iodide, 0.33 molar dissolved iodine, and 1.0 molar lithium perchlorate in 1,2-propylene carbonate.

The cell exhibited a maximum open circuit voltage of 3.87 volts. The cell was placed through 18 cycles. Test results are reported in Table I.

TABLE I.—CHARGE-DISCHARGE CHARACTERISTICS OF CELL

| | Charge | | | | | Discharge | | | | |
|---|---|---|---|---|---|---|---|---|---|---|
| | | | Potential | | OCV—Open circuit at end of charge | | | Potential | | OCV—At end of discharge, volts |
| | Current, ma. | Time, min. | Start, volts | End, volts | | Current, ma. | Time, min. | Start, volts | End, volts | |
| Cycle No.: | | | | | | | | | | |
| 1 | 10 | 30 | 5.00 | 5.00 | 3.20 | 5 | 60 | 2.17 | 2.14 | 2.88 |
| 2 | 10 | 30 | 4.80 | | 3.20 | 5 | 60 | 2.20 | 1.11 | |
| 3 | 10 | 30 | 4.84 | 4.84 | 3.17 | (¹) | 60 | (¹) | (¹) | 2.93 |
| 4 | 5 | 30 | 4.78 | 4.82 | 3.08 | 5 | 60 | 3.08 | 2.22 | 2.90 |
| 5 | (²) | (²) | (²) | (²) | 2.96 | 5 | 60 | 2.65 | 2.20 | 2.93 |
| 6 | 10 | 30 | 4.23 | 4.24 | 3.40 | 5 | 60 | 2.72 | 2.12 | 2.94 |
| 7 | 10 | 30 | 4.33 | 4.26 | 3.32 | 5 | 60 | 2.67 | 1.25 | 2.96 |
| 8 | 10 | 30 | 4.53 | 4.78 | 3.18 | 5 | 60 | 2.40 | 1.25 | 2.93 |
| 9 | 10 | 30 | 4.50 | 4.81 | 3.20 | 5 | 60 | 2.46 | 2.02 | 2.93 |
| 10 | 10 | 30 | 4.50 | 4.72 | 3.25 | (¹) | 60 | (¹) | (¹) | 3.11 |
| 11 | (³) | (³) | (³) | (³) | 3.18 | (¹) | 80 | (¹) | (¹) | 2.93 |
| 12 | 10 | 30 | 4.38 | 4.28 | 3.28 | 5 | 60 | 2.67 | 2.18 | 2.93 |
| 13 | 10 | 30 | 4.39 | 4.39 | 3.32 | 5 | 60 | 2.65 | 1.80 | 2.93 |
| 14 | 10 | 30 | 4.41 | | 3.32 | 10 | 30 | 1.78 | 0.08 | 2.85 |
| 15 | 10 | 30 | 4.50 | 4.62 | 3.27 | 10 | 30 | 1.86 | −0.29 | 2.43 |
| 16 | 10 | 30 | 4.40 | 4.78 | 3.38 | 5 | 60 | 2.48 | 2.10 | 2.95 |
| 17 | (³) | (³) | (³) | (³) | 3.20 | 5 | 60 | 2.78 | 0.70 | 2.97 |
| 18 | 10 | 80 | 4.65 | 4.42 | 3.87 | 10 | 70 | 3.00 | −0.26 | 2.97 |

¹ Varied.
² Trickle-charged at 2 ma. for 63 hours (weekend).
³ Trickle-charged at 2 ma. for 15 hours (overnight).

EXAMPLE 9

Macro-reticular beads of styrene-divinyl benzene copolymer were purchased from Rohm and Haas under the designation "CYM–361." The beads contained pores having an average diameter of 27 angstroms, a porosity of 33.8 percent, and a surface area of 690 m.$^2$/g. The beads did not exhibit ion exchange properties. The beads were crushed and passed through a 50 mesh screen. A similar procedure was used to prepare "Kynar" in particulate form. The crushed beads and "Kynar" were then blended in equal parts by weight. The composition so formed was then charged to a molding surface heated to 165° C. and molded at a pressure in the range of from 22,500 to 30,000 p.s.i.

The barrier so formed was mounted in a cell using as the anolyte, 0.2 M Libr+0.8 M LiCl/O$_4$ in 1,2-propylene carbonate. The catholyte consisted of 1.6 M LiBr and 1.5 M Br$_2$ in 1,2-propylene carbonate. The maximum open circuit voltage observed was 3.62 volts. The cell was put through two cycles in each of which it was charged for one hour at 2 ma./cm.$^2$ and discharge for one hour at 1 ma./cm.$^2$. No evidence of deterioration in use was observed. The cell was left standing for five days during which it was carefully observed for discoloration of the anolyte, thereby indicating bromine penetration of the barrier. No bromine diffusion was visually observed. This was corroborated using an ultraviolet spectrophotometer.

While my invention is disclosed and described with reference to certain preferred embodiments, it is appreciated that numerous modifications will readily occur to those skilled in the art. Accordingly, it is intended that the scope of my invention be determined with reference to the following claims.

What I claim and desire to secure by Letters Patent of the United States is:

1. An electrochemical cell comprised of
   spaced positive and negative electrodes,
   an electrolyte providing an ionically conductive path between said electrodes comprised of
      an organic solvent chosen from the class consisting of alkylene carbonates and lactones having five and six member rings and having substituents chosen from the class consisting of hydrogen and alkyl groups comprised of, in aggregate, as many as three carbon atoms, and an ionically dissociable solute inert to the intermediate molecular weight halogen as well as polyhalides thereof, ion permeable barrier means interposed between said electrodes separating said electrolyte into anolyte and catholyte reservoirs comprised of finely divided particles having through pores of an average diameter sized to hinder the migration therethrough of dissolved halogen and polyhalides thereof, and a binder chosen of a material chemically inert to the constituents of the reservoirs and present in an amount sufficient to join the particles at their points of tangency into a unitary structure, said catholyte reservoir including halogen of intermediate molecular weight when said cell is fully charged, and said positive electrode and said solute both being substantially inert toward said dissolved halogen and polyhalides thereof.

2. An electrochemical cell according to claim 1 in which the negative electrode is comprised of an alkali metal.

3. An electrochemical cell according to claim 1 in which the negative electrode is comprised of lithium.

4. An electrochemical cell according to claim 1 in which said dissolved halogen is bromine.

5. An electrochemical cell according to claim 1 in which said dissolved halogen is iodine.

6. An electrochemical cell according to claim 1 in which said positive electrode utilizes carbon as a current collector.

7. An electrochemical cell according to claim 1 wherein the barrier for separating an anolyte and a catholyte reservoir comprises finely divided particles having through pores of an average diameter less than approximately 200 angstroms and a binder chosen of a material chemically inert to the constituents of the reservoirs and present in an amount sufficient to join the particles at their points of tangency into a unitary structure.

8. An electrochemical cell according to claim 7 in which said particles of said barrier have cation exchange properties.

9. An electrochemical cell according to claim 7 in which said particles of said barrier have through pores of an average diameter less than approximately 100 angstroms.

10. A barrier according to claim 7 in which said binder is a fluorocarbon polymer.

11. In an electrochemical cell including an anolyte reservoir, a catholyte reservoir, and an ionically permeable barrier intended to substantially confine dissolved intermediate molecular weight halogen and polyhalides thereof within the catholyte reservoir, the improvement in which said barrier is comprised of finely divided particles having through pores of an average diameter sized to hinder the migration therethrough of said dissolved halogen and polyhalides thereof, and a binder chosen of a material chemically inert to the constituents of the reservoirs and present in an amount sufficient to join the particles at their points of tangency into a unitary structure.

References Cited

UNITED STATES PATENTS

| | | | |
|---|---|---|---|
| 3,393,092 | 7/1968 | Shaw | 136—6 |
| 3,360,401 | 12/1967 | Grasselli et al. | 136—86E |
| 2,921,110 | 1/1960 | Crowley et al. | 136—86 |
| 2,913,511 | 11/1959 | Grubb | 136—86 |
| 2,901,522 | 8/1959 | Bopp | 136—84 |

WINSTON A. DOUGLAS, Primary Examiner

H. A. FEELEY, Assistant Examiner